United States Patent [19]
Wernig

[11] 3,791,476
[45] Feb. 12, 1974

[54] PROTECTIVE SHIELD FOR MOTOR VEHICLE OCCUPANT

[76] Inventor: James H. Wernig, General Delivery, Kennebunkport, Maine 04046

[22] Filed: Oct. 27, 1969

[21] Appl. No.: 869,697

[52] U.S. Cl. .......... 180/91, 280/150 AB, 296/84 K, 296/97 J
[51] Int. Cl. ............................................. B60r 21/08
[58] Field of Search ... 280/150 AB; 296/84 K, 97 J, 296/97 H; 180/91

[56] References Cited
UNITED STATES PATENTS

| | | | |
|---|---|---|---|
| 2,855,216 | 10/1958 | Sacks | 296/84 K |
| 2,592,573 | 4/1952 | Joncas | 296/84 K |
| 3,495,675 | 2/1970 | Hass et al. | 180/91 |
| 3,325,208 | 6/1967 | Rose | 296/84 K |
| 3,011,823 | 12/1961 | Maher | 296/84 K |
| 3,118,700 | 1/1964 | Wimmersperg | 296/84 K |
| 2,931,665 | 4/1960 | Sandor | 296/84 K |
| 2,933,343 | 4/1960 | Potts | 296/84 K |
| 2,592,573 | 4/1952 | Joncas | 296/84 K |
| 3,085,827 | 4/1963 | Cederberg et al. | 296/97 H |

*Primary Examiner*—Drayton E. Hoffman
*Attorney, Agent, or Firm*—A. F. Baillio

[57] ABSTRACT

Shields for minimizing head injuries to front seat occupants of propelled vehicles as a result of being thrown against the windshield of the vehicle by a collision which are automatically moved from a stored position to a position between the occupants and the windshield in advance of significant deceleration of the vehicle. The shields are constructed and disposed so that they afford more complete protection to all of such occupants and interfere to the minimum extent with their vision when the shields are in operative position.

The shields normally serve as the sun visors of the vehicle and are made of two panels which are normally held in overlying positions but are moved to side by side position when the shields are automatically interposed between the front seat occupants and the windshield so that they cover a greater area of the windshield and afford more protection.

The shields can, however, be moved manually in the same manner as conventional sun visors from their stored position to a position in which they serve to shade the front seat occupants' eyes from glare and back to stored position without disabling the mechanism which automatically operates them in the event of a collision or extending the shields.

9 Claims, 14 Drawing Figures

PATENTED FEB 12 1974

INVENTOR.
JAMES H. WERNIG
BY

ATTORNEY

INVENTOR.
JAMES H. WERNIG

INVENTOR.
JAMES H. WERNIG

PROTECTIVE SHIELD FOR MOTOR VEHICLE OCCUPANT

BACKGROUND OF INVENTION

This invention relates to means for minimizing injury to occupants of self-propelled vehicles as a result of being thrown against a wall of the vehicle by a collision. Particularly, it relates to shields which are ordinarily stored so they do not interfere with the occupant's vision and are automatically interposed between the occupants and the wall in the event of a collision.

The prior art contains a number of devices of this general character but all fall short of adequacy in a number of respects. These devices appear to be collected in class 296, subclass 84 and there seems to be little basis for choice between them as far as adequacy is concerned.

SUMMARY OF INVENTION

A principal object of the invention is to provide a shield which will be automatically moved from a stored position to a position between an occupant and a wall of the vehicle in advance of significant deceleration of the vehicle.

Another principal object of the invention is to make the same member serve as such a shield and a sun visor and make it in two panels which normally overlie each other but are moved to side by side relation when the member is automatically interposed between the occupant and the wall of the vehicle so that it covers a greater area of the wall and affords more protection but may be moved manually in the same manner as conventional sun visors from its stored position to a position in which it serves to shade the occupant's eyes from glare and back to stored position without disabling the mechanism which automatically operates it in the event of a collision or extending the shield.

For a better understanding of the nature and objects of the invention, reference is made to the following specification and accompanying drawing wherein the preferred embodiment of the invention is described and shown:

DESCRIPTION OF PREFERRED EMBODIMENT

Figure 1:
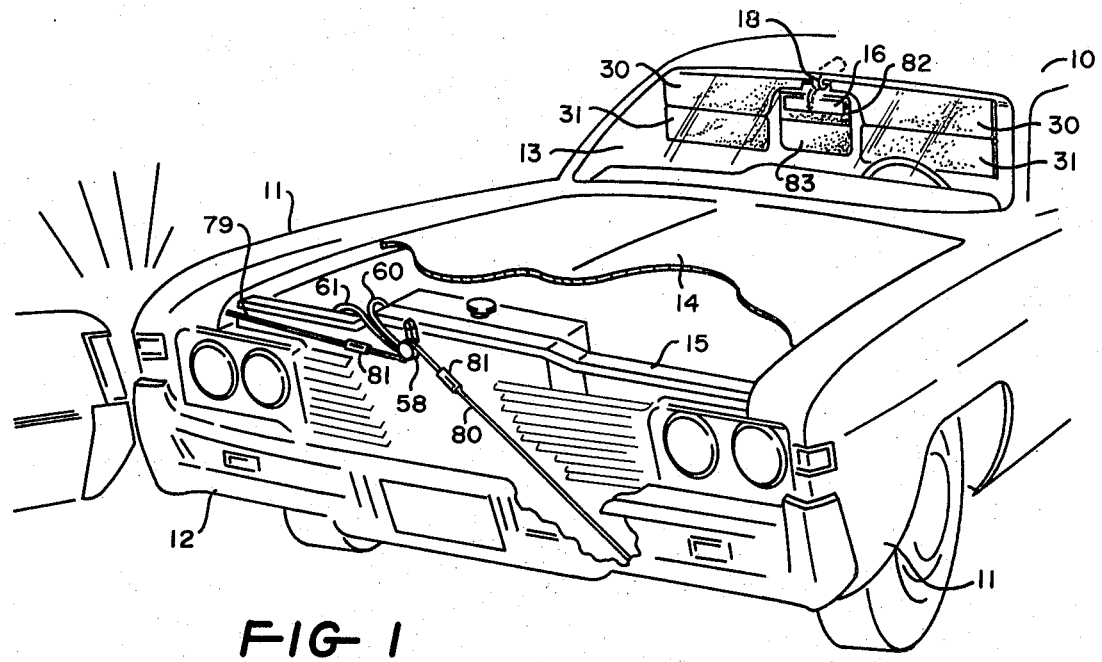
FIG. 1 is a perspective view of the front portion of an automotive vehicle on which the preferred embodiment of my invention is installed and a rear portion of a preceding vehicle.

The automotive vehicle shown in the drawing includes a frame (not visible), and a body 10, front fenders 11 and a front bumper 12 mounted on the frame. The body defines the compartment for the driver and passengers and has a windshield 13 at its front end. Forward of the body is an engine compartment which is defined by the front fenders 11 and a hood 14. The front fenders are tied together near their forward ends by a cross member 15.

Within the body above the windshield in the middle of the vehicle is mounted a rear view mirror 16 and rearward of the mirror is secured through a mounting flange 17 an actuator 18 for the shields.

The actuator 18 includes a housing 19 which is closed at one end by a removable cover plate 20. Within the housing is a rotor 21 with stub axles 22 formed on it which are journalled in the end walls of the housing. Through the axles and the body of the rotor extends a square opening 23.

Near the sides of the vehicle above the windshield are secured brackets 24. Between each of the brackets and the actuator extends a tubular shaft 25 with a tapered and squared inner end 72 which fits into one of the stub axles 22 on the rotor so that the tubular shaft turns with it. The outer end of each of the shafts 25 is mounted to turn in one of the brackets 24. Mounted within each of the tubular shafts 25 to slide lengthwise thereof is a solid actuating rod 26 which is urged by a spring 27 at its outer end into contact with one of two cylindrical plungers 28 within the interior of the opening 23 in the rotor.

On each of the tubular shafts 25 is mounted to swing through an elongated parti-cylindrical sleeve 29 on its upper edge a shield which consists of upper and lower panels 30 and 31. The particylindrical portion of each sleeve encircles the tubular shaft on which it is mounted and has wings 32 which straddle the edge of the upper section 30 and are secured to it. The inner end of the particylindrical portion of each of the sleeves is encircled by a clamp 33 which may be adjusted by a screw 34 to adjust the friction between the clip and the tubular shaft it encircles.

Figure 3:
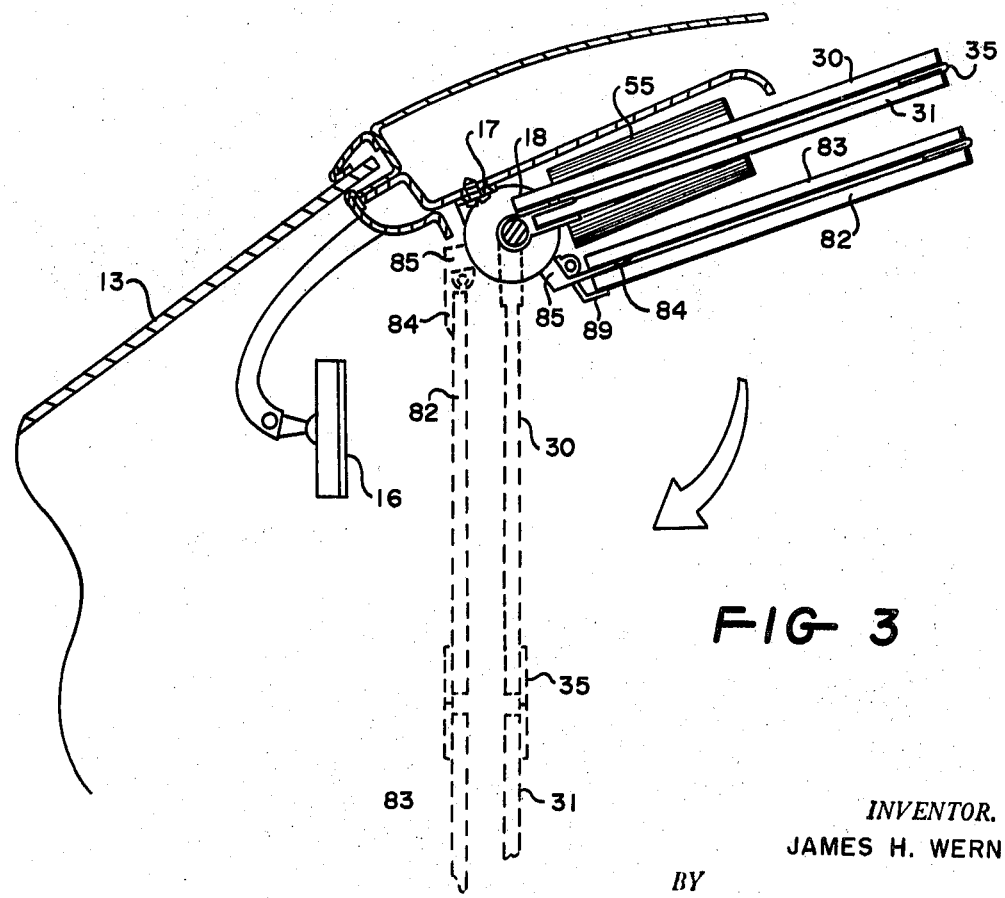
FIG. 3 is a side elevation of the intermediate and one of the main shields and their actuator installed in the vehicle.
Figure 2:
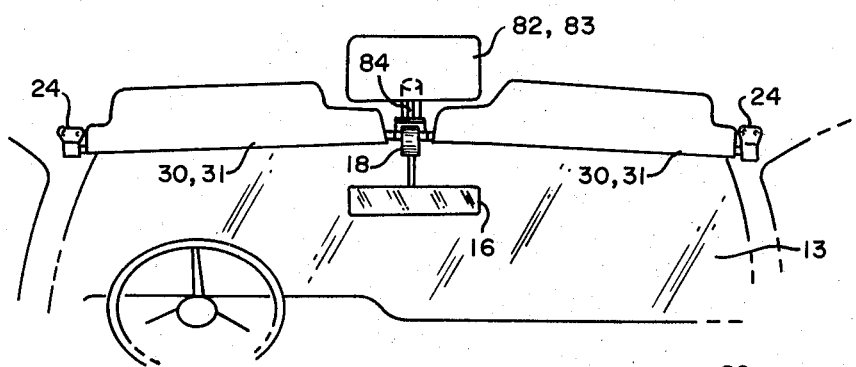
FIG. 2 is an elevation of the shield and the actuator therefor as seen from within the vehicle.

The upper and lower panels of each of the shields 30–31 are connected by a flexible web 35 which permits them to move from the overlying position in which they are shown in solid lines to the side by side position in which they are shown in dash lines in FIG. 3. The two panels are normally held in their overlying position by engagement of a clip 36 on the lower edge of the lower panel with a portion of the actuating rod 26 inward of the notch 73 through cut-outs 37 and 38 in the sleeve 29 and tubular shaft 25. There is, however, embodied in the web 35 a wavy wire spring 39 which moves the lower panel into side by side relation with the upper panel when the clip 36 is released from the rod 26.

Figure 4:
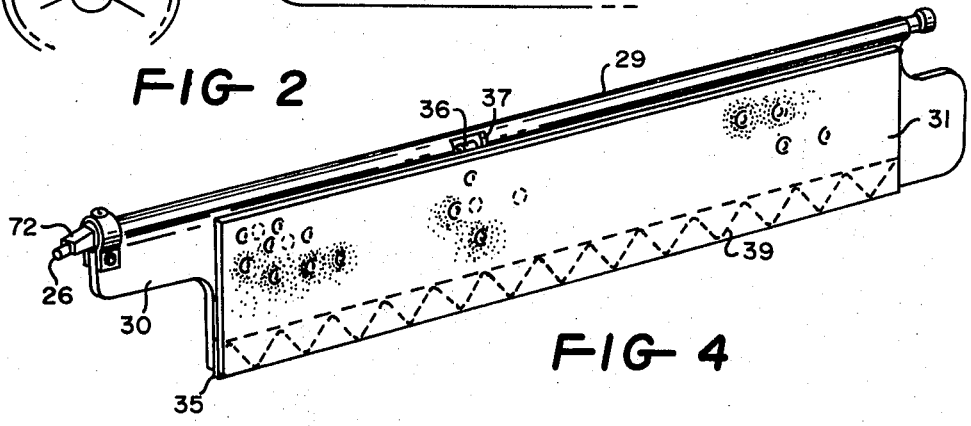
FIG. 4 is a perspective view of one of the main shields with the two panels overlying each other.
Figure 6:
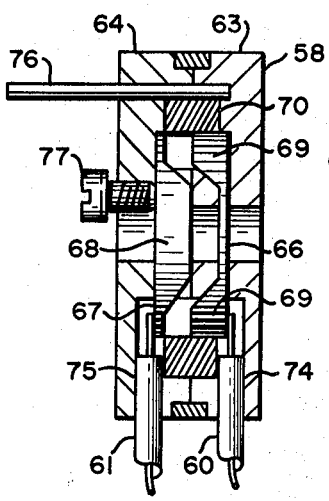
FIG. 6 is a sectional view of the switch with parts in elevation.
Figure 5:
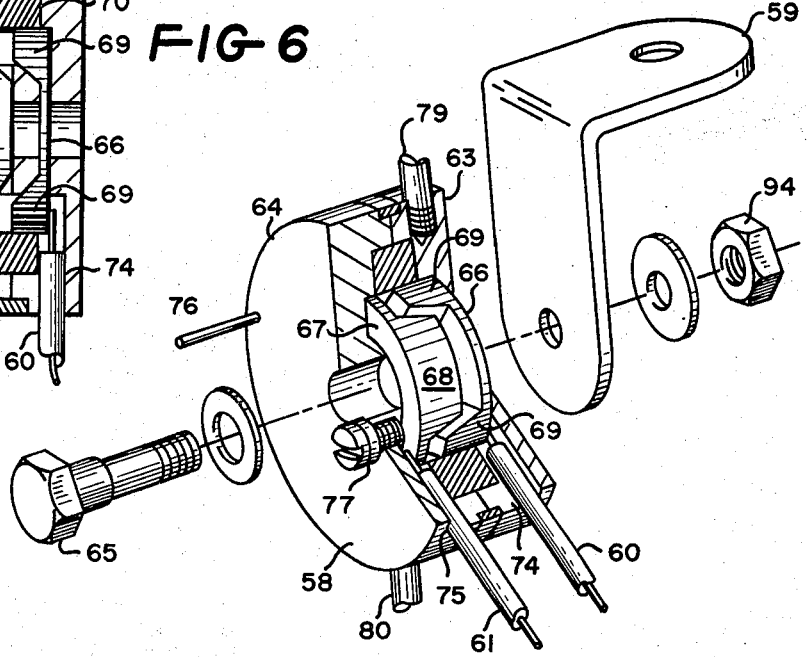
FIG. 5 is a perspective exploded view of the switch for activating the actuator and its mounting bracket with portions of the switch in section.
Figure 7:
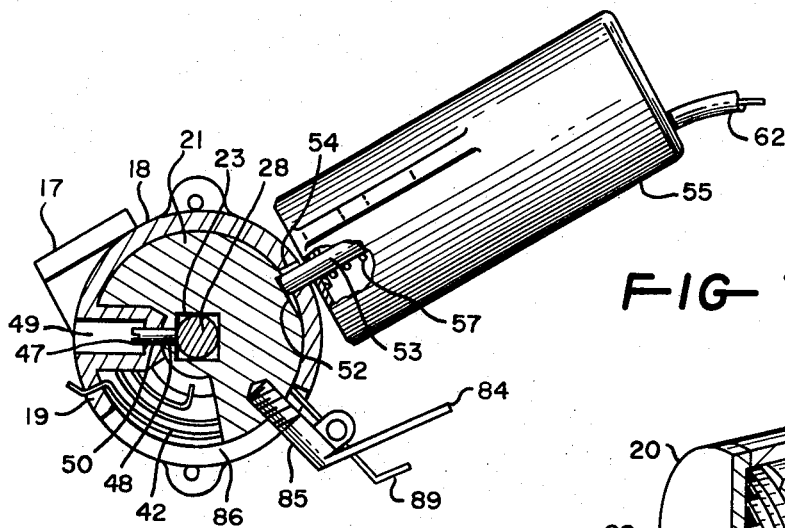
FIG. 7 is a sectional view of the actuator with the solenoid in elevation.
Figure 8:
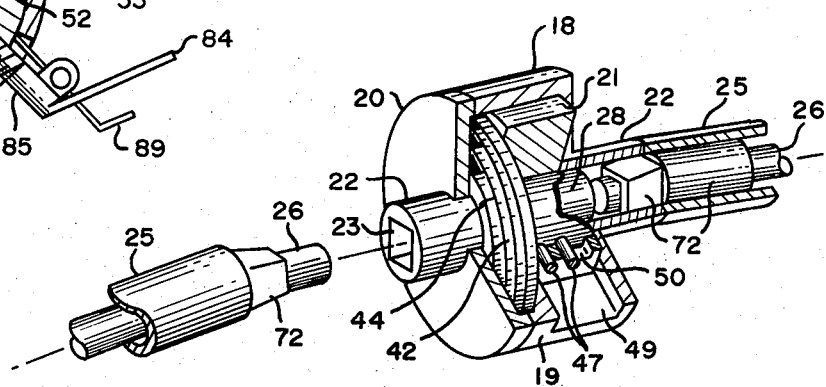
FIG. 8 is an exploded perspective view of the actuator and portions of the actuating mechanism for the main shields with parts of the actuator broken away.
Figure 9:
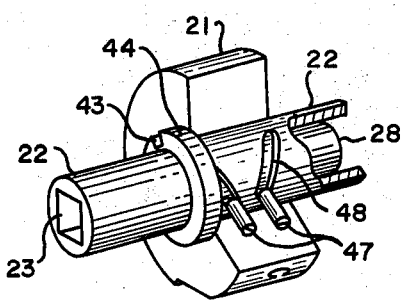
FIG. 9 is a perspective view of the rotor of the actuator with parts broken away.
Figure 10:
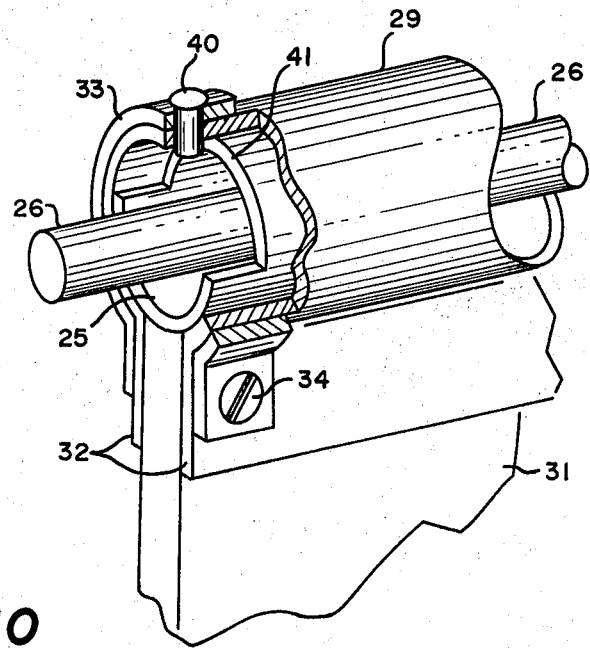
FIG. 10 is a fragmentary perspective view of the inner end of one of the main shields with parts broken away.
Figure 11:
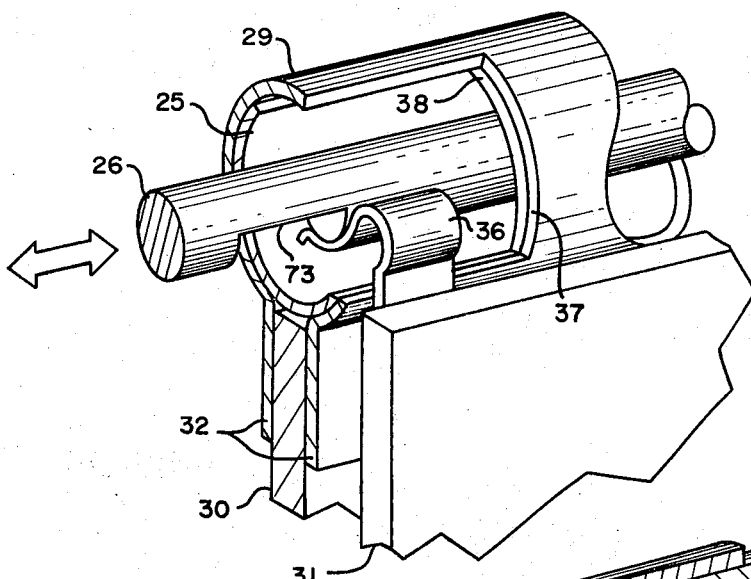
FIG. 11 is a fragmentary sectional perspective view of an intermediate portion of one of the main shields.
Figure 12:
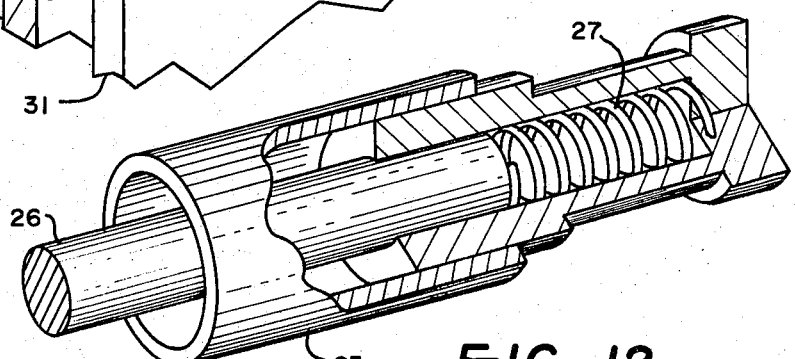
FIG. 12 is a fragmentary perspective view of one end of the actuating mechanism for the main shields with parts broken away.
Figure 13:
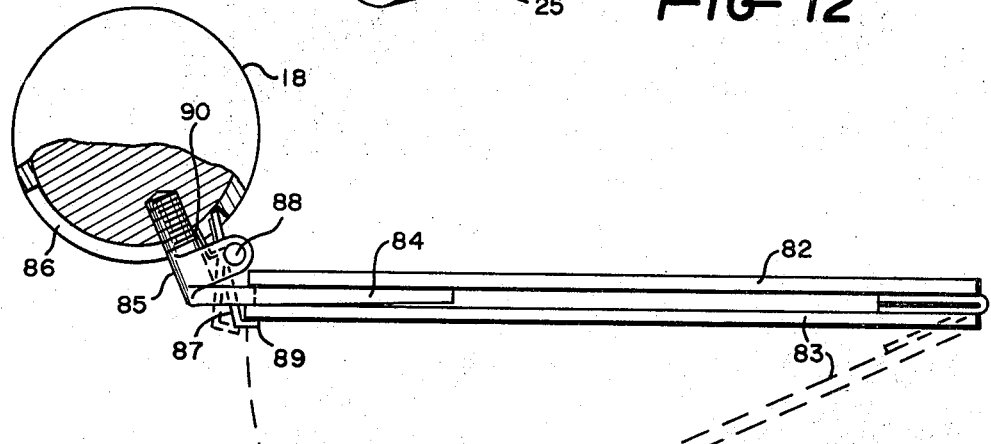
FIG. 13 is a side elevation of the intermediate shield and the actuator.
Figure 14:
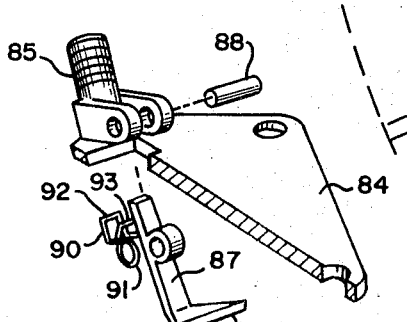
FIG. 14 is an exploded perspective view of the mounting bracket and detent for the intermediate shield.

The panels 30 and 31 of the shields are perforated as shown in FIG. 4 so that the driver will be able to see through them when the panels are in side by side relation. However, so that the shields may serve effectually as sun visors when the panels are in their overlying positions, the perforations in the panels are located so that they do not register when the panels are in this position.

The cut-outs 38 in the tubular shafts 25 are of sufficient extent circumferentially that the shields 30–31 may be swung on the shafts from the stored positions in which one is shown in FIG. 3 to their operative positions as sun visors (somewhat forward of the dash line position in FIG. 3) without releasing the clips 36 or striking them against the ends of the cut-outs. To prevent the clips becoming damaged by striking the ends of the cut-outs 38, there is provided at the inner end of each of the shields 30–31 a stop 40 which extends through the clamp 33 and sleeve 29 into a cutout 41 in the tubular shaft 25 whose ends are so located that the stop will strike one of them before the clip 36 strikes the corresponding end of the cut-out 38.

Within the housing 19 of the actuator 18 between the cover plate 20 and the rotor 21 around a rib 44 on one of the stub axles 22, there is installed a flat coil spring 42. The inner end of the spring 42 is hooked in a notch 43 in the rib 44 and the outer end in an opening 45 in the housing and the spring is pre-stressed so that it tends to turn the rotor and the tubular shafts 25 in the direction to swing the shields 30–31 downwardly and forwardly toward the windshield.

The plungers 28 are keyed by pins 47 to cam slots 48 in the bottom of a cut-out 49 in the rotor and longitudinal slots 50 in the bottom of a hollow internal rib 51 on the housing 19 which projects into the cut-out in the rotor so that when the rotor turns in the direction to move the shields downwardly and forwardly toward the windshield the plungers move outwardly. The plungers, in turn, push the rods 26 outwardly and move the notches 73 in the rods into registration with the clips 36 so that the springs 39 in the webs 35 can swing the lower panels 31 of the shields from overlying to side by side relation to the upper panels 30.

The squared ends of the tubular shafts 25 which extend into the stub axles of the rotor are at a small angle to the main length thereof because the brackets 24 have to be disposed somewhat to the rear of the actuator 18 because of the rearward curvature of the windshield. However, this will not affect the operation of the actuating rods 26 because they have adequate clearance in the tubular shafts 25. It will not affect the operation of the tubular shafts because of the taper in their squared ends 70. The wobble of the projecting ends of the rods 26 will not affect the operation of the shafts 25 or rods 26 because of the clearance of the projecting ends in the openings 23 in the rotor.

The actuator springs 42 are sufficiently strong to turn the rotors against the friction between the sleeves 29 and tubular shafts 25 and actuate the plungers 28 and rods 26 to release the clips 36 and the lower panels of the shields 30–31 if the shields are in use as sun visors when the actuator is activated.

The spring 42 is normally restrained from turning the rotor by a latch which consists of a notch 52 in the outer surface of the rotor and a detent 53 which extends through an opening 54 in the housing 19 of the actuator into the notch. The detent is formed on the end of the armature of a solenoid 55 which forms a part of the actuator and is mounted on the housing 19 through a bracket 56. The detent is normally held by a spring 57 against the surface of the rotor and in the notch 52 when it registers with it and is retracted by the armature to release the spring 42 to turn the rotor when current is supplied to the coil of the solenoid.

To activate the solenoid 55, there is provided a normally open switch 58 mounted on a bracket 59 which is secured to the cross member 15 which extends between the front fenders of the car. One terminal of the switch is connected by a wire 60 to one terminal of a power source, such as the storage battery of the car, and the other terminal of the switch is connected by a wire 61 to one terminal 62 of the coil of the solenoid. The other terminals of the battery and coil are grounded so that current is supplied to the coil when the switch is closed.

The switch 58 includes two body members 63 and 64 of insulating material mounted to rotate with respect to each other on a shouldered screw 65 which also with a nut 94 secures the switch to the bracket 59. On the inner faces of the body members are mounted conductive rings 66 and 67 which carry interfitting contacts 68 and 69. The rings and the contacts are separated and held against axial displacement with respect to the body members by an insulating disc 70 with an opening 71 through which the contacts extend. The contacts are held against circumferential displacement with respect to the body members on which they are mounted by the wires 60 and 61 which are soldered to them and seated in grooves 74 and 75 in the faces of the body members. The contacts are normally centered with respect to each other with their end faces separated and may be held in this position during installation of the switch by a pin 76 which extends into holes in the body members which register when the contacts are centered. The end faces of the contacts are inclined and the ring 67 is made of flexible spring material with its outer face opposite the contact 69 in line with a screw 77 which is threaded into the body member 64. The screw 77 can be turned to move the contact 69 toward or allow it to move away from the contact 68 and thus move the end faces of the contacts toward or away from each other to vary the circumferential movement required to bring end faces into contact.

To operate the switch, there is provided on each of the body members an arm 78. One of the arms is connected to one of the fenders 11 by a rod 79 and the other to the bumper 12 by a rod 80. In each of the rods, there is installed a turnbuckle 81 to adjust its length.

The rods 79 and 80 are installed with the switch contacts held in centered (open) position by inserting the pin 76 in the openings in the body members which register when the contacts are in centered position and adjusted by use of the turnbuckles 81 so that the contacts remain centered when the pin is removed. The screw 77 is adjusted to position the contacts so that any displacement of the fenders, bumper or cross member beyond that incident to normal vibration of the car will result in closing one set of contacts and activation of the solenoid.

Because the fenders, bumper and cross member are relatively easily crushed or displaced, such a front end collision will displace one or more of them sufficiently to close the contacts 68 and 69 a fraction of a second before anything sufficiently solid, such as the engine or the frame, is encountered to significantly decelerate the vehicle or throw the occupants toward the windshield with injurious force. The switch thus activates the actuator in advance of significant deceleration of the vehicle or movement of the occupants toward the windshield by inertia instead of simultaneously as inertia actuators do and thus affords this margin of time to get the shields 30-31 between the occupants and the windshield before their heads strike the windshield.

The shields 30-31 are ordinarily sufficient to protect the driver and a passenger in his normal position in the front seat in the event of a collision with an object straight ahead of the vehicle. But they may not be sufficient if the collision has a sufficiently lateral component to throw one of them against the rear view mirror or the portion of the windshield below it that is not covered by these shields or if there is a person in the middle of the front seat.

To protect all of the front seat occupants under such circumstances, a third shield is provided to cover the rear view mirror and the portion of the windshield between the shields 30-31 in the event of a collision. This shield is composed of upper and lower panels 82 and 83 hinged together similarly to the sections 30 and 31 of the main shields except that the lower panel folds below instead of above the upper panel when the two panels are in overlying relation.

The intermediate shield 82-83 is mounted on the rotor of the actuator by a bracket 84 which is secured to the upper panel 82 and has an arm 85 which extends through a cut-out 86 in the housing of the actuator to the rotor and is secured to it. To latch the lower panel of the shield 82-83 to the upper panel when the shield is in stored position, there is provided a detent 87 which extends through an opening in the bracket 84 and is mounted to swing on a pin 88 which is carried by the bracket. The detent has a foot 89 sufficiently below the upper panel to extend under the lower panel and hold it in underlying relation to the upper panel and an extension above the pin 88 which projects into the cut-out 86 and engages an end of it sufficiently forcefully when the rotor is latched against movement to move the foot to this position against the resistance of a spring 90 which urges it from under the lower panel to release the latter. The spring 90 consists a double wire loop 91 which encircles the pin 88 and straddles the detent 87 with ends 92 and 93 which are disposed between and bear against the arm 85 and the extension of the detent above the pin, respectively.

When the spring 42 turns the rotor of the actuator to move the shields 30-31 to their interposed positions, it moves the shield 82-83 in the same direction and the extension of the detent 87 away from the end of the cut-out 86 so that the spring 90 pushes the foot 89 from under the lower panel and releases it whereupon the hinge spring moves it into side by side relation to the upper panel.

To return the shields from their interposed positions to other stored positions, if the switch 58 is open, the lower panel of the shield 82-83 is swung upwardly against the upper panel and the shield as a whole to its stored position whereupon the latch 52-53 and detent 87 will hold the shield in its stored position with the lower panel up against the upper panel. Assuming the friction between the sleeves 29 and shafts 25 is insufficient to move the shields 30-31 with the shield 82-83 when the former are in their extended positions, it will be necessary to perform corresponding operations on the shields 30-31, whereupon the friction between the sleeves and shafts and the clips 36 will hold these shields in their stored positions with their constituent panels against each other. If the shields 31-32 have moved upwardly with the shield 82-83, it will, of course, be necessary to swing them down again against the friction between the sleeves and the shafts before performing the last-described operation.

It is contemplated that the panels 30 and 31 and 82 and 83 will be constructed so that they will yield by both crushing and bending and/or stretching. They will then owe their ability to minimize injury to two or three factors. One is their crushability. Another is that they do not conform to curvature of the windshield and, therefore, yield further by bending before solid contact is made with the windshield. The third is their ability to conform to the shape of the head and thus increase the effective area of contact with the windshield. The shields thus reduce the velocity of impact and increase the effective area of contact with the windshield.

I claim:

1. In an automotive vehicle, a shield which includes a panel, means for mounting the panel so that it can move from a stored position to a position in which it is interposed between an occupant and a wall of the vehicle, and another panel which is connected to the first-mentioned panel so that it moves with it but can move with respect to it from a face to face relation when the panels are in stored position to a side by side relation when the panels are in interposed position, a latch for holding the panels in face to face relation, means for moving the second-mentioned panel from face to face to side by side relation to the first-mentioned panel when the latch is released, an actuator for moving the shield into interposed position, and means for releasing the latch upon movement of the shield toward interposed position so that the means for moving the second-mentioned panel may move it from face to face to side by side relation to the first-mentioned panel as the shield is moved toward interposed position.

2. In an automotive vehicle, a shield which includes a panel, a rotatable hollow shaft on which the panel is mounted so that it can swing from a stored position to a position in which it is interposed between an occupant and a wall of the vehicle and another panel which is hinged to the first-mentioned panel so that it swings with it but can swing with respect to it from a face to face relation when the panels are in stored position to a side by side relation when the panels are in interposed position, a latch for holding the panels in face to face relation, a spring for swinging the second-mentioned panel from face to face to side by side relation to the first-mentioned panel when the latch is released, an actuator for rotating the hollow shaft and swinging the shield into interposed position, and means within the hollow shaft for releasing the latch upon swinging of the shield toward interposed position so that the spring may swing the second-mentioned panel from face to face to side by side relation to the first-mentioned panel as the shield is swung toward interposed position.

3. The invention claimed in claim 2 in which the means for releasing the latch includes means moved by the actuator.

4. In a self-propelled vehicle which includes relatively easily deformed or displaced portions between occupants of the vehicle and external bodies, a shield for interposition between an occupant and a wall of the vehicle in the event of a collision, an actuator for moving the shield into such interposition, and means for activating the actuator which includes a switch which is located at a distance laterally from a relatively easily deformed or displaced fixed portion of the vehicle and is electrically connected to the actuator, and switch operating means which extends laterally from the switch to the last-mentioned relatively easily deformed or displaced portion of the vehicle to operate the switch if such portion is deformed or displaced.

5. The invention claimed in claim 4 in which the switch is mounted on another relatively easily deformed or displaced portion of the vehicle so that the switch is operated if either of such last-mentioned portions is deformed or displaced.

6. The invention claimed in claim 4 in which the relatively easily deformed or displaced portions are fixed portions of the vehicle.

7. In a self-propelled vehicle which includes relatively easily deformed or displaced portions between occupants of the vehicle and external bodies, a shield for interposition between an occupant and a wall of the vehicle in the event of a collision, an actuator for moving the shield into such interposition, and means for activating the actuator which includes a switch which is located at a distance laterally from two laterally spaced relatively easily deformed or displaced portions of the vehicle and is electrically connected to the actuator, and switch-operating means which extends laterally from the switch to each of the last-mentioned relatively easily deformed or displaced portions of the vehicle to operate the switch if any of such last-mentioned portions is deformed or displaced.

8. The invention claimed in claim 7 in which the switch is mounted on another relatively easily deformed or displaced portion of the vehicle so that the switch is operated if any of such last-mentioned portions is deformed or displaced.

9. In an automotive vehicle, a shield which includes a panel, means for mounting the panel so that it can swing from a stored position to a position in which it is interposed between an occupant and a wall of the vehicle, and another panel which is connected to the first-mentioned panel so that it swings with it but can swing with respect to it from a face to face relation when the panels are in stored position to a side by side relation when the panels are in interposed position, a latch for holding the panels in face to face relation, an actuator for swinging the shield into interposed position, means for swinging the second-mentioned panel from face to face to side by side relation to the first-mentioned panel upon movement of the shield toward interposed position, and means for releasing the latch upon movement of the shield toward interposed position so that the means for moving the second-mentioned panel may move it from face to face to side by side to the first-mentioned panel as the shield is moved toward interposed position.

* * * * *

UNITED STATES PATENT OFFICE
CERTIFICATE OF CORRECTION

Patent No. 3,791,476  Dated Februar6 12, 1974

Inventor(s) James H. Wernig

It is certified that error appears in the above-identified patent and that said Letters Patent are hereby corrected as shown below:

The inventor"s address should read -- Box 501

Kennebunkport, Maine 04046 --.

Signed and sealed this 24th day of September 1974.

(SEAL)
Attest:

McCOY M. GIBSON JR.  C. MARSHALL DANN
Attesting Officer  Commissioner of Patents